March 17, 1942.   C. R. HANNA   2,276,651
REGULATING SYSTEM
Filed May 31, 1940
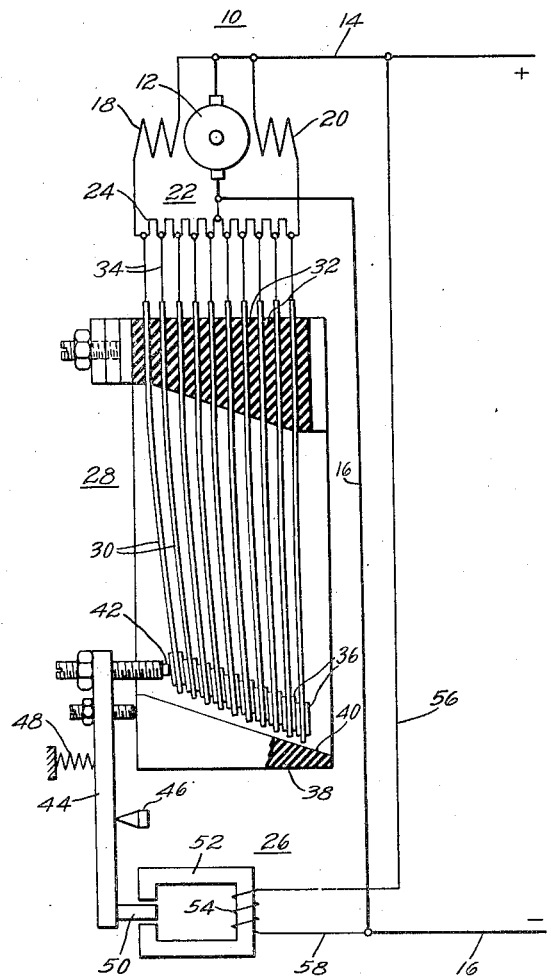
WITNESSES:
C. J. Weller.
James N. Ely
INVENTOR
Clinton R. Hanna.
BY
ATTORNEY Patented Mar. 17, 1942

2,276,651

UNITED STATES PATENT OFFICE 2,276,651

REGULATING SYSTEM

Clinton R. Hanna, Pittsburgh, Pa., assignor to Westinghouse Electric & Manufacturing Company, East Pittsburgh, Pa., a corporation of Pennsylvania Application May 31, 1940, Serial No. 338,073

4 Claims. (Cl. 171—223)

This invention relates to voltage regulating systems and, particularly, to regulating systems for use with low-voltage generators of the type employed in airplanes and other low-voltage equipment.

An object of this invention is to provide for regulating the output voltage of a generator having two parallel connected field windings by controlling the energization of each of the field windings progressively and in a predetermined sequence.

Other objects and advantages of this invention will be apparent from the following description when taken in conjunction with the accompanying drawing, the single figure of which is a diagrammatic view of the improved apparatus and system embodying the features of this invention.

Referring to the drawing, the invention is illustrated by a reference to a regulating system for regulating the voltage of a generator 10. The generator 10 illustrated is driven by any suitable prime mover, not shown, and comprises an armature 12 electrically connected as by means of conductors 14 and 16 to any given load which is to be supplied. In the particular embodiment illustrated the generator 10 is provided with a plurality of shunt field windings 18 and 20 connected in parallel across the armature 12. In order to control the energization of the field windings 18 and 20, a resistor 22 having a plurality of resistor sections 24 is associated with the field windings 18 and 20 and so disposed that a different portion of the resistor 22 is electrically connected in series circuit relation with each of the field windings 18 and 20.

As illustrated, the variable resistor 22 comprises one of the elements of a rheostatic controller which controls the energization of the field windings 18 and 20 in response to the output voltage of the generator 10. In order to control the number of resistor sections 24 in circuit with the field windings 18 and 20, respectively, and to control the manner in which the resistor sections are included in the circuit, a control unit comprising a magnetic structure 26 and a leaf spring assembly 28 is provided and so associated with the resistor 22 and the conductors 14 and 16 as to effectively control the electrical connections of the resistor sections 24.

The leaf spring assembly 28 corresponds in structure to that disclosed in the copending application of C. R. Hanna et al., Serial No. 203,876, filed April 23, 1938, for Regulators, and assigned to the same assignee as this application. Without going into a detailed discussion of the leaf spring assembly 28, it comprises a plurality of leaf springs 30 arranged in a stack having their fixed ends insulated from each other by layers 32 of fishpaper or other suitable insulating material and connected by conductors 34 to a plurality of points or taps between the resistor sections 24 of resistor 22. The opposite ends of the leaf springs 30 carry suitable contact members 36 and are free to move and are biased into an engagement with a stop 38 of any suitable insulating material having a sloping surface 40 for limiting their motion in one direction and for spacing the free ends of the spring leaves 30 out of circuit closing engagement. The driving element 42 carried by a movable arm 44 actuates the leaf springs 30 away from the stop when it is actuated as will be explained more fully hereinafter.

In practice the stop 38 is so positioned on the supporting base of the assembly and with respect to the ends of the leaf springs 30 that the springs are brought against the sloping stopping surface 40 with a slight loading or biasing force and are accurately spaced from one another at their free ends regardless of a lack of straightness of the individual leaves 30. Although not shown in the drawing, the stop 38 is usually disposed for movement about a given point on the supporting base of the assembly to vary the angle of the sloped stopping surface 40 relative to the ends of the spring leaves 30 whereby the spacing between the leaves will be increased by a counterclockwise movement of the stop 38 or decreased by a clockwise movement of the stop. Such arrangement of the spring leaves 30 and the stop 38 permits a free unrestricted movement of the spring leaves 30 in a direction away from the sloping surface 40 of the stop 38.

The magnetic structure 26 employed in conjunction with the spring leaf assembly 28 for controlling the movement of the spring leaves 30 can be of any suitable arrangement, or, as illustrated, the arrangement of the magnetic structure for mounting and actuating the movable arm 44 may correspond to that disclosed in copending application of Ralph A. Geiselman, Serial No. 219,217, filed July 16, 1937, for Regulators, and assigned to the same assignee as this application. The magnetic structure 26 diagrammatically illustrated is provided with a pivot 46 about which the movable lever arm 44 is adapted to move against the bias of a spring 48 in accordance with the force exerted on an armature 50 carried by the movable arm 44 and positioned within an air gap of the stationary core 52 of the magnetic circuit energized by a winding 54. The winding 54 is so connected by conductors 56 and 58 as to be energized in accordance with the voltage across conductors 14 and 16.

Although illustrated for an extreme condition of the circuit, the magnetic structure 26 and leaf spring assembly 28 are usually so arranged that for a given voltage across conductors 14 and 16, the magnetic pull on the armature 50 balances the force of the spring 48 to maintain the lever arm 44 in such a position as to permit a portion of the spring leaves 30 to be spaced apart, thereby electrically connecting a portion or a number of the resistor sections 24 of the resistor 22 in circuit with the field windings 20 and 18.

In operation, assuming that the prime mover, not shown, is operating the generator 10 at a given speed for developing a given voltage across conductors 14 and 16, the winding 54 is energized in accordance with the voltage across the conductors 14 and 16 so as to effect the separation of the spring leaves 30 beginning at the right-hand side of the stack and progressing towards the left while at the same time by reason of the separation of the contact members 36 carried by the spring leaves 30 progressively introducing resistor sections 24 beginning at the right-hand terminal of the resistor 22 and progressing to the other terminal of the resistor. Thus, for a normal predetermined voltage across conductors 14 and 16, all of the resistor sections 24 in series circuit relation with the field windings 20 are introduced into the circuit therewith, while a portion of the resistor sections 24 are connected in series circuit relation with the field winding 18.

If for any reason the voltage across conductors 14 and 16 decreases, the winding 54 is, accordingly, deenergized so that the driving member 42 actuates the spring leaves 30 towards the right away from the stop 38 to short-circuit or shunt more of the resistor sections 24 from the series circuit relation with the field winding 18. If such shunting of the resistor sections associated with the field winding 18 is insufficient to energize the winding 18 to effect the desired increase in the generator voltage, additional sections 24 of the resistor 22 which are associated with the field winding 20 are shunted from the circuit with the field winding 20 to effectively increase the energization of the winding and thereby increase the voltage delivered by the generator 10.

If for any reason the voltage across conductors 14 and 16 should increase above a desired rated value, the winding 54 is further energized to actuate the driving member 42 from its engagement with the spring leaves 30 to thereby remove the short-circuited condition from the resistor sections 24 and progressively insert the resistor sections in series with the field winding 18 to decrease the energization of the winding and thereby decrease the voltage delivered by the generator 10.

With the regulating system of this invention utilizing a plurality of shunt fields connected in parallel and the variable resistor having a different portion connected in series circuit relation with each of the field windings and the associated apparatus disposed to progressively control the number of resistor sections introduced in circuit with the respective field windings, it is evident that a very sensitive control of the voltage generated can be obtained. Further, since the resistor sections are connected in series circuit relation as described hereinbefore, it is evident that the energization of the field windings is secured in a predetermined sequence which, since the effects of the field windings on the generated voltage are cumulative, provides for good regulation of the generated voltage.

It is evident, of course, that the connection which apportions the number of resistor sections in circuit with the different field windings need not be at the midpoint of the resistor, but instead can be at any desired point in order to provide different ratios of maximum to minimum current in the field windings as desired. Further, the leaf assembly utilized functions efficiently in the system of this invention. This is apparent when it is considered that, because of the size of the flexible leaves and the contact members carried by each leaf, the leaf assembly has a definite rated value. However, by employing the assembly as described to control the progressive insertion of the resistor sections in series with each of the parallel connected field windings in a predetermined sequence, approximately twice the rated value of the leaf assembly is obtained, since each half of the number of leaves of the assembly carries as a maximum only the current of its associated field winding. The operation of the leaf assembly at twice its normal rated voltage in this system is, of course, dependent on the fact that it must be so constructed as to accommodate the voltage which is to be controlled. This regulating system, therefore, finds special application in controlling the voltage of low-voltage generators of the type utilized on airplanes.

Although this invention has been described with reference to a particular embodiment thereof, it is, of course, not to be limited thereto except insofar as is necessitated by the prior art and the scope of the appended claims.

I claim as my invention:

1. In a regulating system, a generator, means for controlling the output voltage of the generator including two field windings connected in parallel circuit relation, a variable resistor having a plurality of resistor sections a number of which are disposed to be connected in series circuit relation with only one of the field windings in a predetermined sequence and the remainder of the sections being disposed to be connected in series circuit relation with only the other of the field windings in a predetermined sequence, and means responsive to the output voltage of the generator for progressively varying the number of the resistor sections connected in circuit with the field windings, said means progressively varying the connections of the resistor sections associated with said one of the windings before the connections of the resistor sections associated with the other field windings are varied for controlling the energization of each field winding throughout its range of operation in a predetermined sequence.

2. In a regulating system, a generator, means for controlling the output voltage of the generator including two field windings connected in parallel circuit relation, the field windings being cumulative in their effect on the generator, a variable resistor having a plurality of resistor sections a number of which are disposed to be connected in series circuit relation with only one of the field windings in a predetermined sequence and the remainder of the sections being disposed to be connected in series circuit relation with only the other of the field windings in a predetermined sequence, and means responsive to the output voltage of the generator for progressively varying the number of the resistor sections connected in circuit with first one of the field windings and then the other for controlling the energization of each field winding in a predetermined sequence, the progressive control of the variable resistor providing for maximum change in the energization of one of the field windings before a change in the energization of the other winding is initiated.

3. In a regulating system, a generator, means for controlling the output voltage of the generator including two field windings connected in parallel circuit relation, a variable resistor having a plurality of resistor sections a number of which are disposed to be connected in series circuit relation with only one of the field windings in a predetermined sequence and the remainder of the sections being disposed to be connected in series circuit relation with only the other of the field windings in a predetermined sequence, means disposed to connect the resistor sections associated with the field windings progressively from one terminal of the resistor throughout the range of the resistor for progressively varying the number of sections connected in circuit with first one of the field windings and then the other, and means responsive to the output voltage of the generator for controlling the operation of the means for progressively connecting the resistor sections in circuit with the field windings to control the energization of each field winding in a predetermined sequence.

4. In a regulating system, a generator, means for controlling the output voltage of the generator including two field windings connected in parallel circuit relation, the field windings being cumulative in their effect on the generator, a variable resistor having a plurality of resistor sections a number of which are disposed to be connected in series circuit relation with only one of the field windings in a predetermined sequence and the remainder of the sections being disposed to be connected in series circuit relation with only the other of the field windings in a predetermined sequence, means responsive to pressure disposed to connect the resistor sections progressively from one terminal of the resistor throughout the range of the resistor to progressively vary the connections of the sections associated with said one of the windings before the connections of the sections associated with the other of the windings are varied, and means responsive to the output voltage of the generator for controlling the pressure applied to the pressure responsive means to control the progressive connection of the resistor sections in circuit with the field windings and the energization of each field winding in a predetermined sequence.

CLINTON R. HANNA.